US012390825B2

(12) United States Patent
Gao

(10) Patent No.: US 12,390,825 B2
(45) Date of Patent: Aug. 19, 2025

(54) SPRAY GUN

(71) Applicant: Ningbo Xinchen Intelligent Appliance Co., Ltd., Zhejiang (CN)

(72) Inventor: Jianshu Gao, Zhejiang (CN)

(73) Assignee: Ningbo Xinchen Intelligent Appliance Co., Ltd., Ningbo (CN)

(*) Notice: Subject to any disclaimer, the term of this patent is extended or adjusted under 35 U.S.C. 154(b) by 535 days.

(21) Appl. No.: 17/739,969

(22) Filed: May 9, 2022

(65) Prior Publication Data

US 2023/0286006 A1 Sep. 14, 2023

(51) Int. Cl.
*B05B 15/50* (2018.01)
*B05B 7/24* (2006.01)

(52) U.S. Cl.
CPC ............ *B05B 15/50* (2018.02); *B05B 7/2408* (2013.01)

(58) Field of Classification Search
CPC .............................. B05B 15/50; B05B 7/2408
USPC .......................................................... 239/104
See application file for complete search history.

(56) References Cited

U.S. PATENT DOCUMENTS 3,255,972 A * 6/1966 Hultgren .............. A01C 23/042 239/323
5,853,102 A * 12/1998 Jarrett .................... B44D 3/122 220/23.87
5,865,341 A * 2/1999 Martin ................... B23K 9/202 221/312 A
5,894,927 A * 4/1999 Bennett ................ B65D 83/005 206/804
5,900,293 A * 5/1999 Zettle ...................... B29C 49/04 220/666
5,918,815 A * 7/1999 Wu ....................... B05B 7/2478 285/361
5,938,389 A * 8/1999 Shore ..................... B21D 22/28 413/69
5,975,346 A * 11/1999 Imperato ................ B44D 3/127 220/834

FOREIGN PATENT DOCUMENTS

CN 207013187 U 2/2018

OTHER PUBLICATIONS

CN207013187 English translation by Google (Year: 2018).*

* cited by examiner

*Primary Examiner* — Chee-Chong Lee
(74) *Attorney, Agent, or Firm* — Jose Cherson Weissbrot

(57) ABSTRACT

A spray gun includes a spray gun body and an atomization hood arranged at an outlet of the spray gun body, and a pipeline is arranged in the spray gun body; the spray gun further includes a cleaning joint and a straw component that are installed on the spray gun body, the atomization hood and the cleaning joint are detachably installed at the outlet of the spray gun body, and the atomization hood and the cleaning joint are used alternately; the cleaning joint is connected with one end of the pipeline, and the straw component is correspondingly connected with the other end of the pipeline.

9 Claims, 7 Drawing Sheets

SPRAY GUN

TECHNICAL FIELD

The present invention relates to the technical field of spraying equipment, in particular to a spray gun that is convenient to clean.

BACKGROUND

The spray gun is a piece of spraying equipment for performing atomization treatment on liquid, and for spraying an object to obtain a uniform and aesthetically pleasing coating layer.

The existing Chinese patent with No. CN207013187U discloses a direct current spray gun, which includes a gun body, a material storage bucket, a shell, a trigger and a handle. A nozzle and an atomization hood arranged outside the nozzle are respectively arranged at the front end of the gun body, a needle plug mounting chamber is arranged in the gun body, a needle plug is movably arranged in the needle plug mounting chamber, and the gun body is formed with a transfusion pipeline. One end of the transfusion pipeline is connected with a suction pipe arranged in the material storage barrel and the other end is communicated with the needle plug mounting chamber. A fan is arranged at the tail end of the shell, a first air duct communicating with an atomization channel is arranged in the gun body, and the handle is respectively provided with a power supply for supplying power to the fan and a trigger switch for controlling the on/off of the power supply. A second air duct communicating with the material storage barrel and a control valve for controlling the on/off of the second air duct are also arranged in the gun body, and the trigger switch, the needle plug and the control valve are in link fit with the trigger. During the use process, the liquid flowing out from the nozzle is immediately blown away by air pressure around the atomization hood to form an atomization effect, namely, the spraying process may be realized.

However, the above direct current spray gun has the following disadvantages: the front end of the gun body is only provided with the atomization hood, which only allows the spraying gun to have a spraying function but does not allow the spaying gun to have the function of cleaning the passage during the use process.

SUMMARY

The purpose of the present invention is to provide a spray gun convenient to clean, with the effects of multi-purpose and more functions.

The above purpose of the utility model is achieved by the following technical solution: a spray gun that can include a spray gun body and an atomization hood arranged at an outlet of the spray gun body, and a pipeline is arranged in the spray gun body. The spray gun further includes a cleaning joint and a straw component that are installed on the spray gun body, the atomization hood and the cleaning joint are detachably installed at the outlet of the spray gun body, and the atomization hood and the cleaning joint are used alternately. The cleaning joint is connected with one end of the pipeline, and the straw component is correspondingly connected with the other end of the pipeline.

By adopting the above technical solution, when the present invention is used for spraying, the atomization hood is installed at the front outlet of the spray gun body, and air pressure blowing to the direction of the atomization hood is formed in the spray gun body, so as to perform the spraying process. When the utility model is used for cleaning, the atomization hood can be removed from the spray gun body, and then the cleaning joint is correspondingly installed at the original position for installing the atomization hood. After the other end of the cleaning joint is connected with a water pipe, the water flowing quickly in the water pipe can flow into the pipeline in the spray gun body by the cleaning joint, then access into the straw component along the pipeline, so as to achieve the effects of cleaning the passage, self-cleaning, multi-purpose and more functions.

The further setting of the utility model is as follows: the cleaning joint or the atomization hood are installed on the spray gun body by a compression nut, one end of the cleaning joint extends externally to form a limited bulge loop, the compression nut includes a stop end face, an external thread is arranged on the outer wall of the front end of the spray gun body, the compression nut is in threaded connection with the external thread, and the stop end face fits with the stopper of the limited bulge loop.

By adopting the above technical solution, when the cleaning joint or the atomization hood is installed on the spray gun body, one end of the cleaning joint can pass through the compression nut, so that the stop end face resists to the limited bulge hoop, and then the compression nut is in threaded connection with the front end of the spray gun body. Quick installation may be achieved through the compression nut, and the disassembly and replacement are convenient. In addition, the same compression nut is adopted for fixing, so as to reduce the quantity of accessories and achieve the purpose of saving the cost.

The further setting of the utility model is as follows: the cleaning joint includes a screw cleaning joint, an internal thread is arranged on the inner wall of the screw cleaning joint, a first connecting pipe is integrally formed in the screw cleaning joint, and the first connecting pipe is connected with the port of the pipeline.

By adopting the above technical solution, when the screw cleaning joint is installed on the spray gun body, the first connecting pipe is connected with the pipeline, and the screw cleaning joint may be in fit connection with the screw connecting water pipe.

The further setting of the utility model is as follows: the cleaning joint includes a quick connecting cleaning joint, a quick connecting neck and an annular groove are arranged on the outer wall of the quick connecting cleaning joint, a second connecting pipe is integrally formed in the quick connecting cleaning joint, and the second connecting pipe is connected with the port of the pipeline.

By adopting the above technical solution, when the quick connecting cleaning joint is installed on the spray gun body, the second connecting pipe is connected with the pipeline, and the quick connecting cleaning joint may be in fit connection with the quick connecting water pipe, so as to achieve quick connection.

The further setting of the utility model is as follows: a limited lug boss is arranged on the outer wall of the spray gun body, and the limited lug boss is in resisting fit with the compression nut.

By adopting the above technical solution, the limited lug boss can achieve a better limiting effect on the compression nut, so as to prevent the damage caused by excessive tightening of the compression nut during the installation process.

The further setting of the utility model is as follows: the pipeline is T-shaped, the T-shaped pipeline includes a horizontal channel and a vertical channel, one end of the horizontal channel is sealed and the other end is opened and connected with the cleaning joint; and one end of the vertical channel is communicated with the horizontal channel and the other end is connected with the straw component.

The further setting of the utility model is as follows: the straw component includes a straw body and a support cover integrally formed on the outer wall of the straw body, and one end of the straw body is inserted into the pipeline, so that the cleaning joint is communicated with the straw body through the pipeline.

By adopting the above technical solution, during use, the water in the water pipe flows into the pipeline through the cleaning joint, and flows into the straw body from the pipeline, so as to achieve the cleaning process of the pipeline inner wall.

The further setting of the utility model is as follows: the support cover is provided with a reinforcing rib.

The further setting of the utility model is as follows: an extending cover is integrally formed on the spray gun body, an annular caulking groove is formed on the outer wall of the support cover, a sealing ring is arranged between the extending cover and the support cover, an inner ring of the sealing ring is embedded into the annular caulking groove, and an outer wall of the sealing ring resists to an inner wall of the extending cover.

In conclusion, the utility model has the following beneficial effects:

1. The manner that the cleaning joint capable of replacing the atomization hood is arranged on the spray gun body not only has the spraying function, but also can realize the self-cleaning process, to clean the pipeline and expand the using range and the using scenario greatly, so the spray gun has effects of multi-purpose and more functions.

2. The same compression nut is adopted to lock the atomization hood on the spray gun body and lock and fix the cleaning joint on the spray gun body, and the same compression nut is adopted for fixing, so as to reduce the quantity of the accessories and achieve the purpose of saving the cost.

Figure 1:
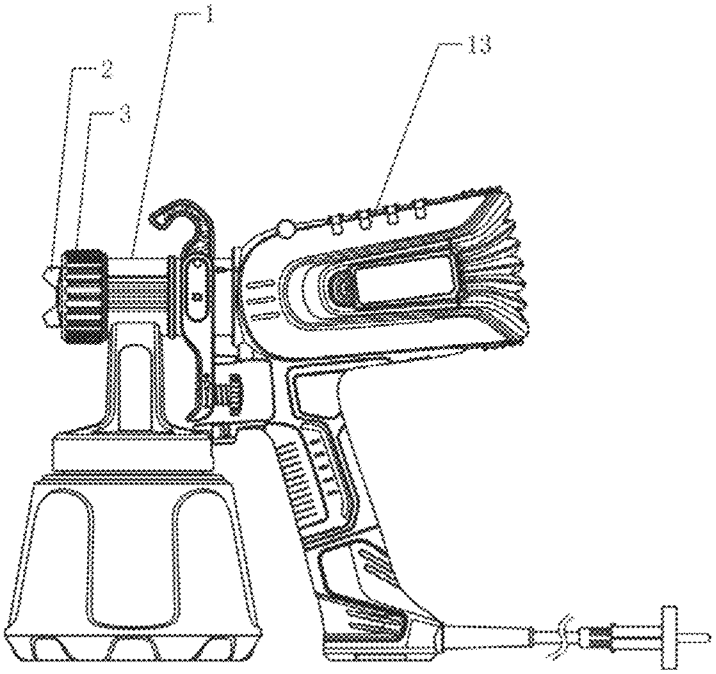
FIG. 1 is a relationship diagram of an installation structure for spraying in embodiment 1 or embodiment 2.
Figure 2:
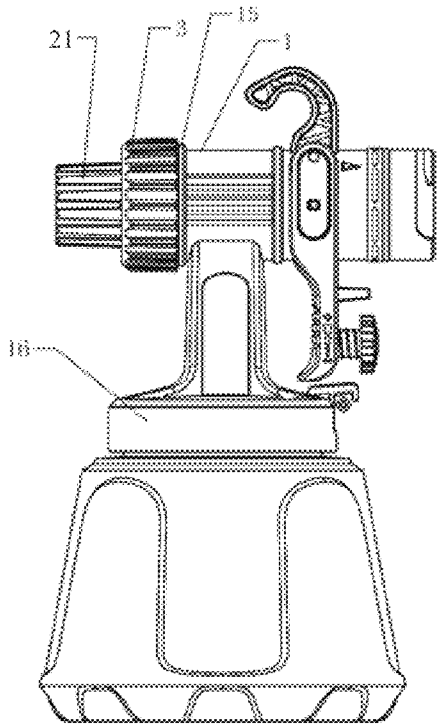
FIG. 2 is a relationship diagram of an installation structure for cleaning in embodiment 1.

In the drawing: 1. Spray gun body; 11. Outlet; 12. Pipeline; 121. Horizontal channel; 122. Vertical channel; 13. Host; 14. External thread; 15. Limited lug boss; 16. Extending cover; 2. Atomization hood; 21. Cleaning joint; 3. Compression nut; 31. Stop end face; 4. Straw component; 41. Straw body; 42. Support cover; 421. Reinforcing rib; 422. Annular caulking groove; 5. Limited bulge loop; 6. Screw cleaning joint; 61. Internal thread; 62. First connecting pipe; 63. Screw connecting water pipe; 7. Sealing ring; 8. Connecting cleaning joint; 81. Connecting neck; 82. Annular groove; 83. Second connecting pipe; 84. Connecting water pipe.

DETAILED DESCRIPTION OF THE EMBODIMENTS

The utility model is further described in combination with drawings below.

Embodiment 1

A spray gun convenient to clean, as shown in FIGS. 1-4, includes a spray gun body 1, the front end of the spray gun body 1 is provided with an outlet 11 while the rear end of the spray gun body 1 is provided with a host 13, an atomization hood 2 and a cleaning joint 21 are detachably installed at the front end of the spray gun body 1, and the cleaning joint 21 and the atomization hood 2 are detachably installed at the outlet 11 of the spray gun body 1, and the cleaning joint 21 and the atomization hood 2 are used alternately, so as to achieve the purposes of multi-function and multi-purpose.

Figure 3:
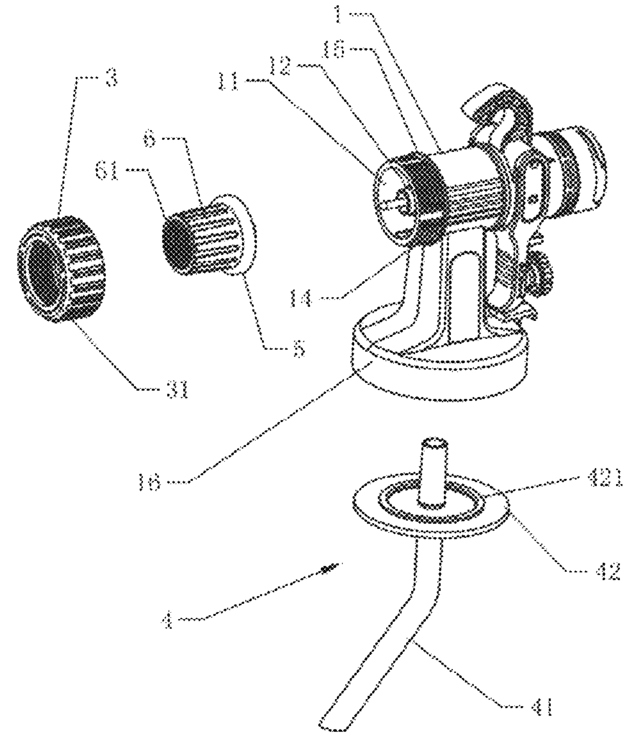
FIG. 3 is an exploded drawing of embodiment 1.
Figure 4:
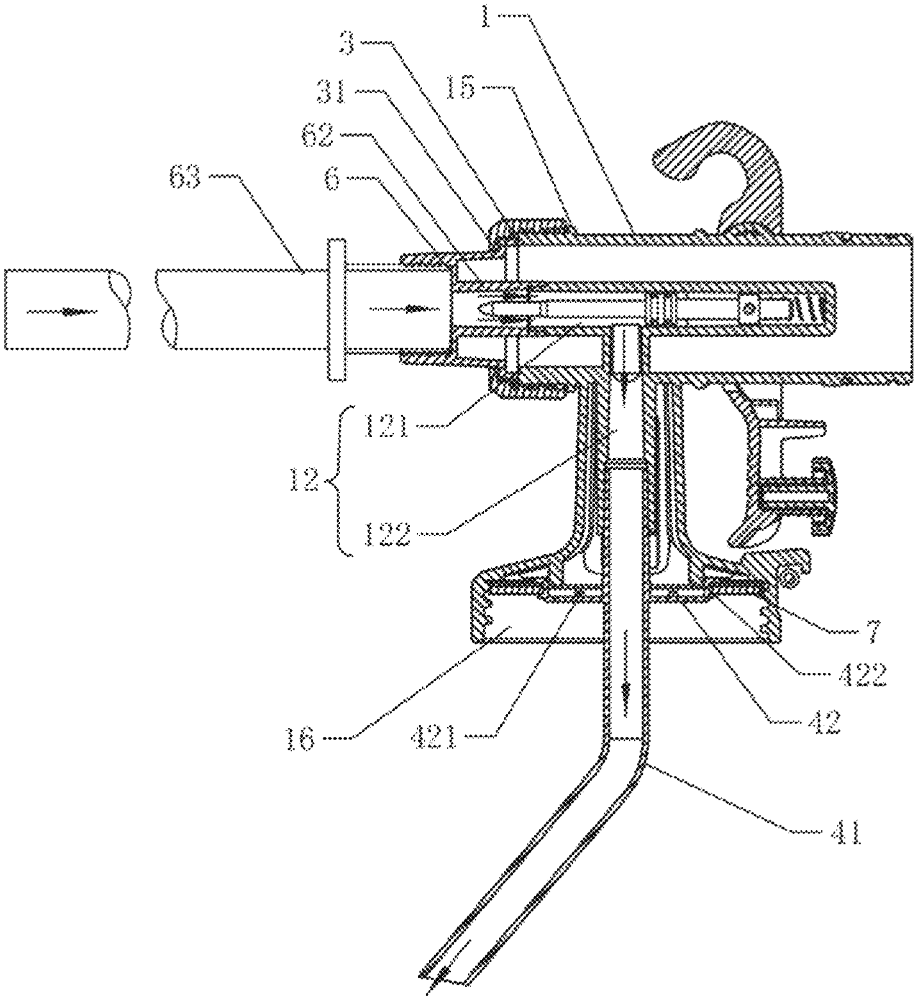
FIG. 4 is a section view of a connecting water pipe in embodiment 1.

As shown in FIG. 3 and FIG. 4, a pipeline 12 is arranged in the spray gun body 1. In this embodiment, the pipeline 12 is T-shaped, the T-shaped pipeline includes a horizontal channel 121 and a vertical channel 122, one end of the horizontal channel 121 is sealed and the other end is opened and connected with the cleaning joint 21; when the atomization hood 2 is installed on the spray gun body 1, a nozzle is installed at the opening of the horizontal channel 121; and one end of the vertical channel 122 is communicated with the horizontal channel 121 and the other end is connected with a straw component 4.

As shown in FIG. 4, the cleaning joint 21 or the atomization hood 2 is installed on the spray gun body 1 by a compression nut 3, one end of the cleaning joint 21 extends externally to form a limited bulge loop 5, the compression nut 3 includes a stop end face 31, an external thread 14 is arranged on the outer wall of the front end of the spray gun body 1, the compression nut 3 is in threaded connection with the external thread 14, and the stop end face 31 fits with the stopper of the limited bulge loop 5. A limited lug boss 15 is arranged on the outer wall of the spray gun body 1, and the limited lug boss 15 is in resisting fit with the compression nut 3. When the cleaning joint 21 or the atomization hood 2 is installed on the spray gun body 1, one end of the cleaning joint 21 can pass through the compression nut 3, so that the stop end face 31 resists to the limited bulge hoop 5, and then the compression nut 3 is in threaded connection with the front end of the spray gun body 1. Quick installation may be achieved through the compression nut 3, and the disassembly and replacement are convenient. In addition, the same compression nut 3 is adopted for fixing, so as to reduce the quantity of accessories and achieve the purpose of saving the cost. The limited lug boss 15 can achieve a better limiting effect on the compression nut 3, so as to prevent the damage caused by excessive tightening of the compression nut 3 during the installation process.

As shown in FIG. 3 and FIG. 4, the cleaning joint 21 includes a screw cleaning joint 6, an internal thread 61 is arranged on the inner wall of the screw cleaning joint 6, a first connecting pipe 62 is integrally formed in the screw cleaning joint 6, and the first connecting pipe 62 is connected with the front port of the pipeline 12.

As shown in FIG. 3 and FIG. 4, the straw component 4 includes a straw body 41 and a support cover 42 integrally formed on the outer wall of the straw body 41, the support cover 42 is provided with a reinforcing rib 421, and one end of the straw body 41 is inserted into the pipeline 12, so that the cleaning joint 21 is communicated with the straw body 41 through the pipeline 12. An extending cover 16 is integrally formed on the spray gun body 1, an annular caulking groove 422 is formed on the outer wall of the support cover 42, a sealing ring 7 is arranged between the extending cover 16 and the support cover 42, an inner ring of the sealing ring 7 is embedded into the annular caulking groove 422, and an outer wall of the sealing ring 7 resists to an inner wall of the extending cover 16.

The basic working principle of the utility model is as follows: when the utility model is used for spraying, the atomization hood 2 is installed at the front outlet 11 of the spray gun body 1, and air pressure blowing to the direction of the atomization hood 2 is formed in the spray gun body 1, so as to perform the spraying process; and the spray gun is widely used for spraying the surface spraying decoration, such as machines, parts, equipment, furniture, daily necessities as well as insecticide, disinfectant, freshener spraying. When the spray gun is used for cleaning, the atomization hood 2 can be removed from the spray gun body 1, and then the screw cleaning joint 6 is correspondingly installed at the original position for installing the atomization hood 2, the first connecting pipe 62 is connected with the pipeline 12, after the other end of the screw cleaning joint 6 is connected with a screw connecting water pipe 63, the water flowing quickly in the water pipe can flow into the pipeline 12 in the spray gun body 1 by the cleaning joint 21, then access into the straw component 4 along the pipeline 12, so as to achieve the effects of cleaning the passage, self-cleaning, multipurpose and more functions.

Since the basic structure of the spray gun body 1 is the same as that in the prior art, detail description is not made herein.

Embodiment 2

Figure 5:
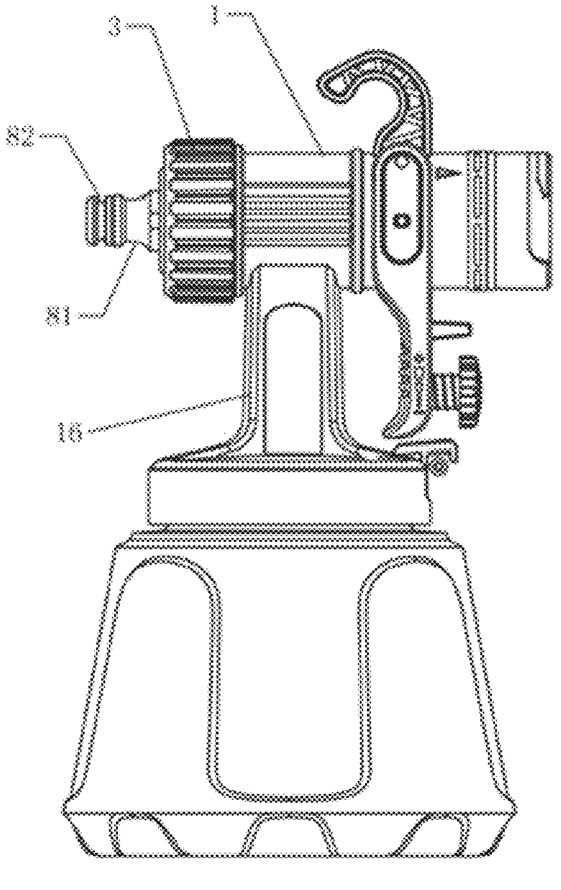
FIG. 5 is a relationship diagram of an installation structure for cleaning in embodiment 2.
Figure 6:
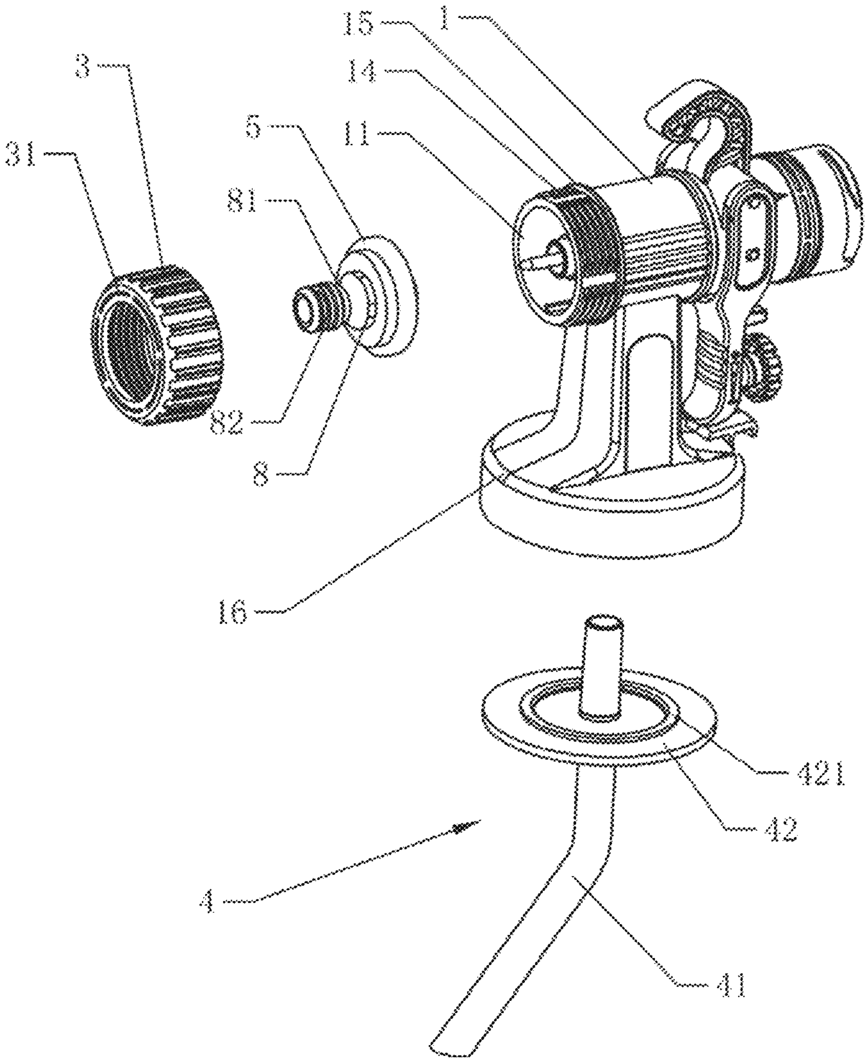
FIG. 6 is an exploded drawing of embodiment 2.
Figure 7:
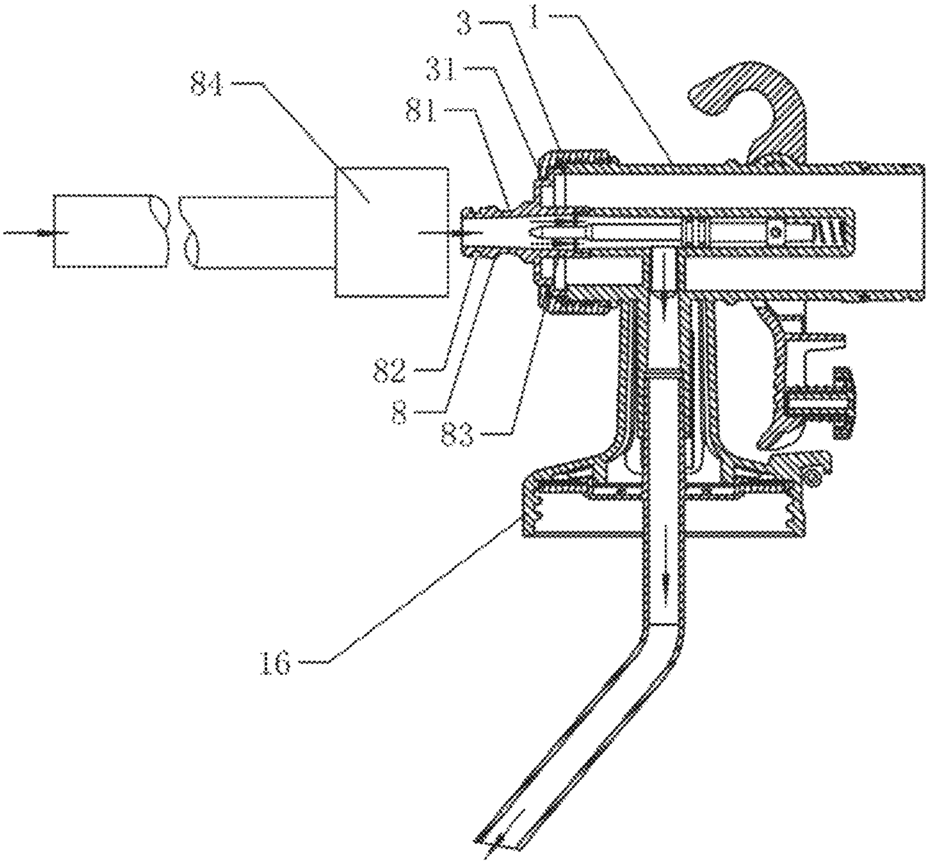
FIG. 7 is a section view of a connecting water pipe in embodiment 2.

A spray gun convenient to clean, as shown in FIGS. 5-7, the difference between this embodiment and the embodiment 1 is as follows: the cleaning joint 21 is set as a connecting cleaning joint 8, of which the outer wall is provided with a connecting neck 81 and an annular groove 82, a second connecting pipe 83 is integrally formed in the connecting cleaning joint 8, and the second connecting pipe 83 is connected with the port of the pipeline 12. When the connecting cleaning joint 8 is installed on the spray gun body 1, the second connecting pipe 83 is connected with the pipeline 12, and the connecting cleaning joint 8 may be in fit connection with the connecting water pipe 84, so as to achieve the purpose of quick connection.

The above embodiments are the better embodiments of the utility model, and the equivalent change or modification made based on the structure, feature and principle in the application scope of the utility model fall into the patent application scope of the utility model.

The invention claimed is:

1. A spray gun, comprising:

a spray gun body having an outlet and an atomization hood, wherein the atomization hood is arranged at the outlet of the spray gun body;

a pipeline is arranged in the spray gun body, wherein the pipeline comprises a horizontal channel and a vertical channel; and a cleaning joint and a straw component, wherein the straw component is installed under the spray gun body, wherein the outlet of the spray gun body is detachably equipped with the atomization hood for spraying and the cleaning joint for cleaning, when spraying is required the atomization hood is installed and the cleaning joint is removed from the spray gun body, and when cleaning is required the cleaning joint is installed at the outlet of the spray gun body and the atomization hood is removed, wherein the cleaning joint is connected with the horizontal channel of the pipeline, and the straw component is connected with the vertical channel of the pipeline.

2. The spray gun according to claim 1, wherein the cleaning joint or the atomization hood is installed on the spray gun body through a compression nut, wherein one end of the cleaning joint extends externally to form a limited bulge loop, wherein the compression nut comprising a stop end face, wherein an external thread is arranged on an outer wall of a front end of the spray gun body, wherein the compression nut is in threaded connection with the external thread, and wherein the stop end face fits with a stopper of the limited bulge loop.

3. The spray gun according to claim 1 or 2, wherein the cleaning joint is set as a screw cleaning joint, wherein an internal thread is arranged on an inner wall of the screw cleaning joint, wherein a first connecting pipe is integrally formed in the screw cleaning joint, and wherein the first connecting pipe is connected with a port of the pipeline.

4. The spray gun according to claim 2, wherein a limited lug boss is arranged on the outer wall of the spray gun body, and wherein the limited lug boss is in resisting fit with the compression nut.

5. The spray gun according to claim 1, wherein the cleaning joint is set as a connecting cleaning joint, wherein a connecting neck and an annular groove are arranged on the outer wall of the connecting cleaning joint, wherein a second connecting pipe is integrally formed in the connecting cleaning joint, and wherein the second connecting pipe is connected with the port of the pipeline.

6. The spray gun according to claim 1, wherein the pipeline is T-shaped, and the horizontal channel has two ends, one end of the horizontal channel is sealed and another end of the horizontal channel is open and connected with the cleaning joint and the vertical channel has two ends, one end of the vertical channel is connected with the horizontal channel and another end of the vertical channel is connected with the straw component.

7. The spray gun according to claim 1, wherein the straw component comprise a straw body and a support cover integrally formed on an outer wall of the straw body, and wherein one end of the straw body is inserted into the pipeline, so that the cleaning joint is connected with the straw body through the pipeline.

8. The spray gun according to claim 7, wherein the support cover is provided with a reinforcing rib.

9. The spray gun according to claim 7, wherein an extending cover is integrally formed on the spray gun body, wherein an annular caulking groove is formed on the outer wall of the support cover, wherein a sealing ring is arranged between the extending cover and the support cover, wherein an inner ring of the sealing ring is embedded into the annular caulking groove, and wherein an outer wall of the sealing ring resists to an inner wall of the extending cover.

* * * * *